June 4, 1929.  H. HOLLAND  1,716,057
TROLLEY DEVICE
Filed Aug. 1, 1927   2 Sheets-Sheet 2
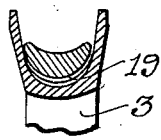
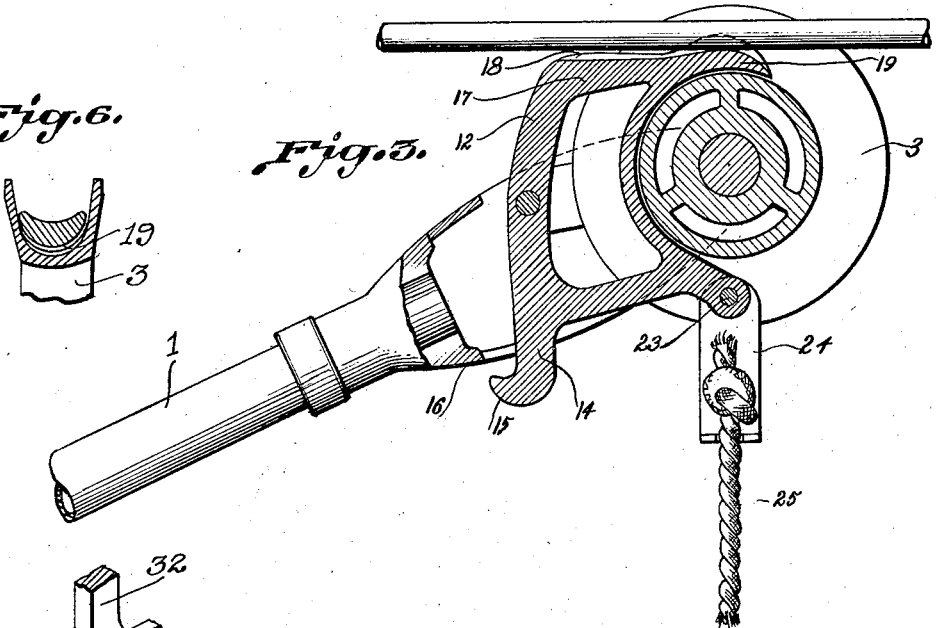
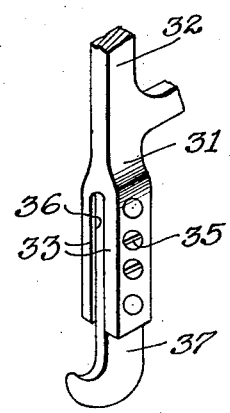
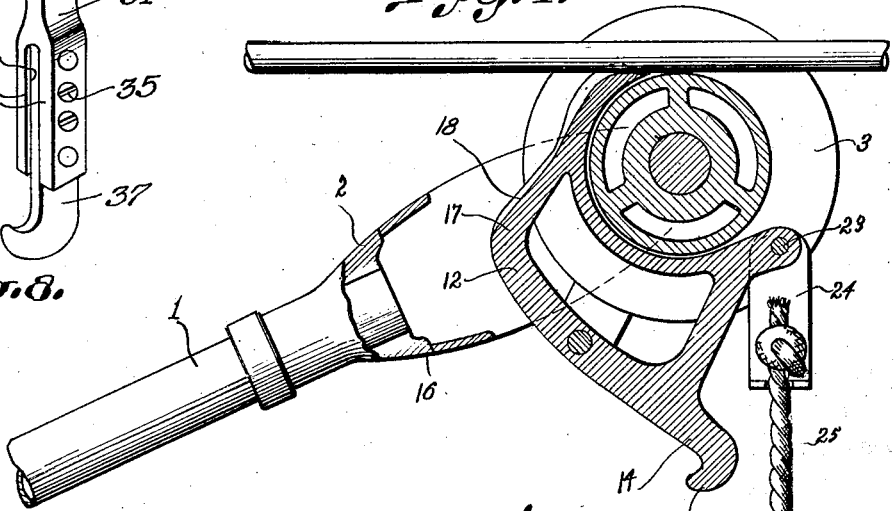
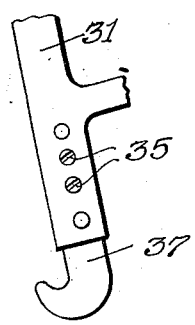
INVENTOR.
Henry Holland
BY
Fay, Oberlin & Fay
ATTORNEYS Patented June 4, 1929.

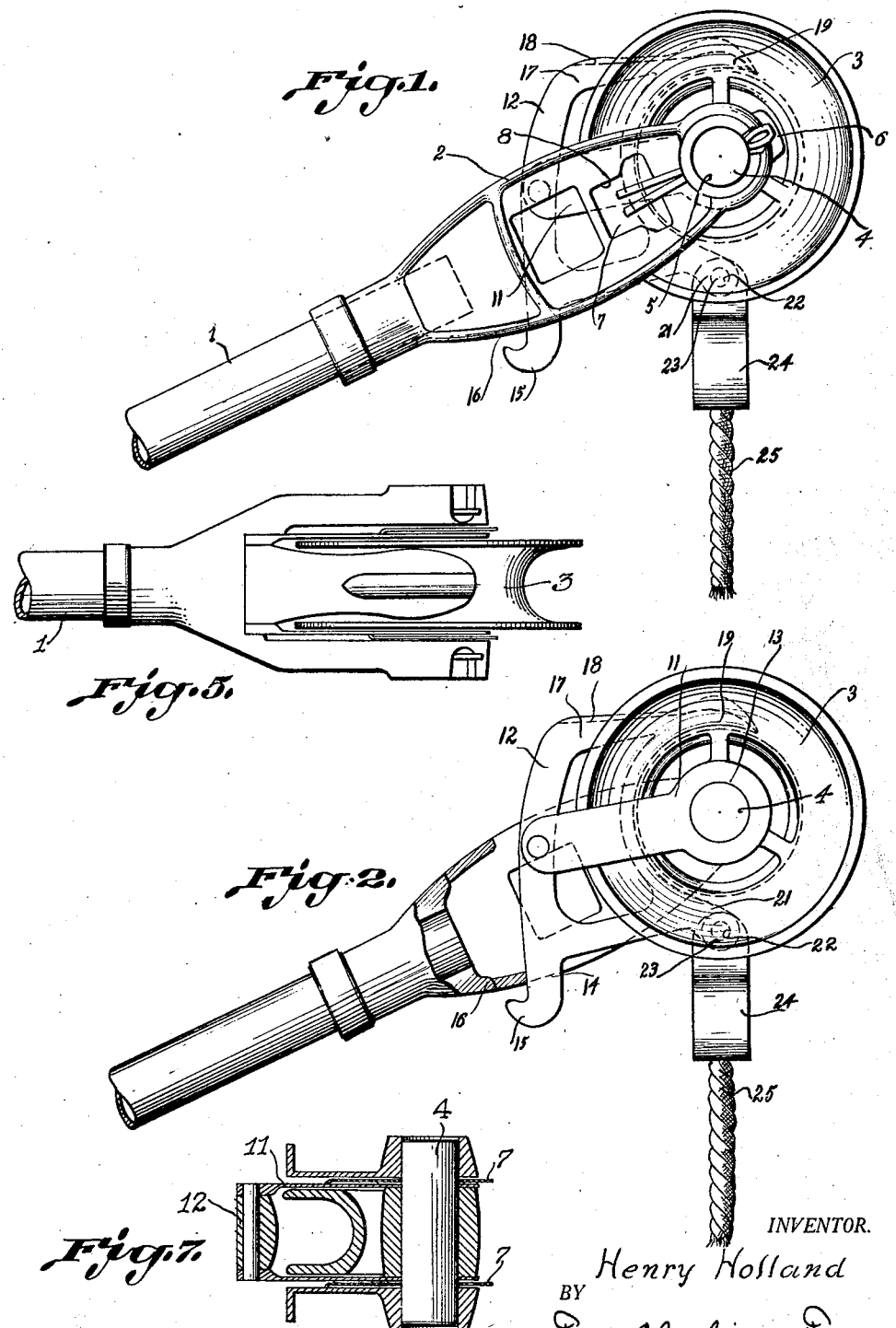

1,716,057

UNITED STATES PATENT OFFICE.

HENRY HOLLAND, OF CLEVELAND, OHIO.

TROLLEY DEVICE.

Application filed August 1, 1927. Serial No. 209,717.

This apparatus as indicated relates to an improved trolley device. More particularly it comprises a trolley having a shoe, and a wheel operatively related with said shoe and adapted to have contact with the trolley wire at times under certain conditions of operation of the trolley car.

Heretofore the use of shoes or slides for carrying a current from a trolley wire have been known, but such devices have had the disadvantage of making it extremely difficult to reverse the direction of the operation of the trolley car without attaching an auxiliary trolley to the wire or changing the position of the trolley or guarding it against dewiring.

The present invention has in view the provision of a trolley device which without any attention whatsoever from the operators of the car will permit the car to be moved forward or backward with equal facility and without danger of injury to the trolley or the wire installation.

Another object of the invention is to provide an improved trolley device in which the shoe normally follows the wire and carries the current through direct contact and having a wheel, the flanges of which are always maintained in position to guide said shoe along the wire to prevent derailment. Another object of the invention is to provide a trolley wheel in such position with reference to a trolley shoe that through the operation of backing the trolley car, the trolley wheel will be brought into active contact with the wire and the shoe will be subordinated to the action of said wheel so that backward movement of the car may be readily carried out without further attention by the operators. Other and further objects of the invention will appear during the course of the following description. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a side elevation of a construction embodying the principles of my invention with the trolley disposed at the usual angle when the shoe and wheel are in operative position with the trolley wire; Fig. 2 is a view similar to Fig. 1 with the portion of the harp toward the observer removed; Fig. 3 is a central vertical sectional view taken through the harp shoe and trolley wheel, with the parts in the position shown in Figs. 1 and 2; Fig. 4 is a view similar to Fig. 3 with the shoe shown in the position assumed when the trolley wheel is moved in reverse position along the trolley wire; Fig. 5 is a top plan view of the trolley wheel; Fig. 6 is a fragmentary sectional view showing the contact portion of the shoe engaged within the groove of the trolley wheel; Fig. 7 is a sectional detailed view showing the stub axle and arrangement of shoe supporting arms and current contacts with reference to the trolley wheel; Fig. 8 is a perspective view showing a portion of the shoe extension with an adjustable stop associated therewith; Fig. 9 is a side elevation showing the adjustable stop for the shoe; and Fig. 10 is an enlarged central longitudinal sectional view showing the adjustable stop portion of the shoe structure.

As is clearly shown in the drawing, the trolley pole 1 carries at its upper end a harp 2 of standard form within which a trolley wheel 3 is mounted upon a stub axle 4 locked within suitable apertures 5 in the sides of said harp by means of cotter pins 6 or like securing devices. The structure described constitutes the standard trolley wheel and my invention is adapted to be positioned within a standard trolley harp with but slight changes in its construction. The trolley wheel is journaled centrally upon the stub axle and contact plates 7 of brass or copper or suitable alloys are inserted in channelways 8 formed in the respective sides of the harp adjacent each side of the stub axle and bearing against the trolley wheel hub to carry the current through suitable connections extending through the trolley pole.

On opposite sides of the trolley wheel, the supporting arms 11 for the trolley shoe 12 are engaged, said arms are apertured adjacent their ends and extend substantially radially from approximately the central portion of the body of the trolley shoe adjacent the periphery of the trolley wheel toward the stub axle of the trolley wheel upon which their apertured ends 13 are engaged. The body of the trolley shoe is preferably an open frame having one side of substantially arcuate form. The lower portion 14 of said shoe body extends rearwardly and is provided with a hook or stop 15 which preferably in the highest position of the trolley wheel abuts against the yoke portion 16 of the harp preventing the shoe from rotating to too great an extent about the stub axle. The upper portion of the body of the shoe terminates in the wire contacting portion 17 of the shoe proper. This portion of the shoe structure is provided with a shallow groove 18 on its upper side and is preferably formed with an under portion 19 of convex outline so as to ride within the groove of the trolley wheel. The position of the shoe is such that when the contact portion is resting substantially in parallel relation with the wire against the trolley wire of normal height, the stop extension thereon will be positioned immediately beneath the same and spaced from the yoke portion of the harp a distance permitting the free rotation of such shoe as the trolley wheel rises when the high elevation of trolley wire is passed over. The arcuate portion of the shoe body terminates at its lower end in an extension arm 21 formed with an eye 22 within which a pivot pin 23 supporting a strap or loop 24 is engaged, said loop being apertured to receive the end of the trolley rope 25, which may be knotted within said loop. The lower end of the trolley rope is preferably engaged upon a caretaker (not shown). The tension on the trolley rope tends to hold the end portion of the shoe in contact with the wire when the car moves forwardly.

As is clearly shown in Figs. 8 to 10 of the drawing, the stop on the shoe section of the device may be made adjustable so that a trolley pole may be adapted for use upon a line having a higher or lower elevation than that for which it was originally designed. To provide for this adjustment of the stop, the lower end 31 of the frame 32 of the shoe body is provided with a bifurcated extension 33 formed with a series of alined apertures within which bolts or screws 34 may be received. A pair of similarly spaced apertures 35 are formed through the shank of a hook-shaped member 36 adapted to be received between the arms of said bifurcated extension and adjusted to a plurality of positions through the engagement of the securing screws in the proper alined apertures of the extension and said shank, which positions the stop 37 at the desired distance from the yoke of the harp.

As stated the grooved portion of the shoe is normally in contact with the trolley wire when the car is moving in a forward direction. The shoe is substantially a flangeless slide, the flanges of the trolley wheel serving to do any necessary guiding when brought into action. The trolley wheel takes all severe service such as passing through switch bands, cross-overs, track-breakers and the like, and when the wheel is brought into action it has rolling contact with the trolley wire. Thus all wear such as would be produced by a shoe with integral flanges is avoided while none of the advantages of the construction are sacrificed. The caretaker normally holds the shoe in operative position except as modified by the action of the trolley wheel in passing through switches, cross-overs and the like, or in reversing the direction of motion of the car. When so reversed the contact shoe will be moved away from the wire and the groove of the trolley wheel will be brought into direct contact with the wire. The friction of the wire against the shoe serving to move the same away from its normal position, against the tension of the caretaker on the trolley rope. When the direction of motion of the car is again changed the shoe immediately resumes full contact with the wire moving into the groove of the trolley wheel through the friction on the wire and the action of the tension of the caretaker on the trolley rope.

The trolley shoe is a light open frame structure and may be readily replaced as wear takes place. The wear of the shoe on the trolley wire is less than that of a wheel and the area of contact with the wire is greater. Thus much greater efficiency electrically as well as mechanically is secured.

The device may be applied to many trolley wheels now in general use by making slight changes in the parts and not discarding any of them. This is brought about by the fact that the shoe is supported on the same pivot as is the trolley wheel and the clearances afforded by the standard trolley harp are adequate to accommodate the trolley shoe structure without changing the position of the wheel.

Thus the device described provides a universal slide and wheel having safety features and which automatically adjusts itself for motion of the car in either direction.

It will be noted that the supporting arms for the shoe section engage with the body section at a point within the arms of the harp and do not at any time project beyond the same to such an extent that they would constitute an obstruction or a projection which might at any time interlock with a cross wire and cause damage to the line.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A trolley device having in combination a shoe and a wheel each rotatable with reference to a common center and means permitting said wheel to serve as a guide for said shoe.

2. A trolley device having in combination a shoe and a flanged wheel each rotatable with reference to a common center, said shoe being adapted to move into position above the wheel with the flanges of said wheel in a position to serve as guides for said shoe.

3. A trolley device having in combination a shoe and a flanged wheel each rotatable with reference to a common center, said shoe being adapted to move into wire contacting position between the flanges of said wheel and said flanges becoming operative over plate contact areas upon the movement of the trolley in a forward direction.

4. A trolley device having in combination a shoe and a flanged wheel mounted upon a common center, said shoe having a portion normally lying between the flanges of the wheel adapted to move into wire contacting position above said wheel upon the forward movement of the trolley and to be rotated out of said position upon the reverse movement of the trolley.

5. A trolley device having in combination a grooved wheel, a shoe having a contact portion within the groove of said wheel and pivotally supported upon a common center with said wheel, and means normally moving said contact portion of the shoe above said wheel into contact with the wire when said trolley moves in a forward direction.

6. A trolley device having in combination a grooved wheel, a shoe having a contact portion within the groove of said wheel and pivotally supported upon a common center with said wheel, and means normally moving said contact portion of the shoe above said wheel into contact with the wire when said trolley moves in a forward direction, and means to limit the rotation of said shoe in one direction.

7. A trolley device having in combination a grooved wheel, a shoe having a contact portion within the groove of said wheel and pivotally supported upon a common center with said wheel, and means normally moving said contact portion of the shoe above said wheel into contact with the wire when said trolley moves in a forward direction, and adapted to be overbalanced when said trolley moves in a reverse direction to bring said wheel into direct contact with the wire.

8. A trolley device having in combination a grooved wheel, a shoe having a contact portion within the groove of said wheel and pivotally supported upon a common center with said wheel, a stop on said shoe to limit its movement in one direction, and a tension member tending to resist the movement of said shoe in the opposite direction and serving to maintain said shoe between said wheel and the trolley wire when said trolley is moved forwardly.

9. A trolley device having in combination a harp, a stub axle mounted in said harp, a grooved trolley wheel journaled centrally upon said axle, pivot arms journalled on said axle on each side of said trolley wheel, and supporting a contact shoe within the groove of said trolley wheel, and a tension rope secured to said shoe to maintain the same above said wheel when the trolley is moved in a forward direction.

Signed by me this 20th day of June, 1927.

HENRY HOLLAND.